3,560,590
DYEABLE POLYESTER COMPOSITION
Andor Schwarcz, Pompton Lakes, Milton Farber, Verona, and Phillip J. Cangelosi, Garfield, N.J., assignors to Uniroyal, Inc., New York, N.Y., a corporation of New Jersey
No Drawing. Filed Feb. 14, 1968, Ser. No. 705,293
Int. Cl. C08g 39/10
U.S. Cl. 260—873
12 Claims

ABSTRACT OF THE DISCLOSURE

The invention relates to shaped articles containing a blend of a major portion of a polyester, a pyridine base polymer and a hydrophilic compound which is a homopolymer or derivative thereof, or copolymer, containing ethylene oxide units (—$CH_2$—$CH_2$—O—), said articles being dyeable with anionic and disperse dyes.

---

The present invention is directed to the production of dye-receptive melt extruded fibers or shaped articles capable of being formed into fibers, from fiber-forming polyesters. More particularly, it is directed to a composition of matter including, as its major constituent, poly(ethylene terephthalate), poly(co-ethylene terephthalate-isophthalate), or the like, which composition of matter may be melt extruded to form fibers or articles such as films and tapes capable of being formed into fibers, which are readily dyed by anionic and disperse dyes.

The composition of matter will be described herein mainly in terms of fibers (both staple and continuous filament), but it is to be understood that other forms also may be produced, such as monofilaments, multifilaments, films, tapes and the like, which can subsequently be processed into fibers.

Polyester fibers are well-known for being inherently undyeable by conventional dyeing techniques due either to lack of polar sites in their molecular structures to which dye molecules may become attached, or to difficulty of penetration of dye molecules into their molecular structures or both. Processes for overcoming these defects have long been sought, because ready dyeability by conventional techniques is a prerequisite for many commercial applications to which these fibers would be outstandingly suited. Various chlorinated and phenolic compounds which swell the polyester, known as "carriers," have been used to facilitate the penetration of water-insoluble ("disperse") dyes into the fiber. In addition to the added expense of the carrier, such a procedure has manifold disadvantages due to toxicity hazards and decrease in fastness of the dyed article and evenness of the dyeing due to the use of the carrier. Other dyeing procedures, such as use of high temperatures and high pressures in dyeing, likewise have many disadvantages.

One method for making hydrophobic fibers such as polyester fibers dyeable involves the addition of large quantities of amine polymer to the polyester prior to extrusion. In such cases, when the amount of additive polymer is in excess of 5% to 10%, the resulting fiber is dyeable with anionic and other classes of dyes but such fiber has disadvantages such as (1) the physical properties are degraded; (2) the blended material, because of incompatibility of the mixed polymers, is difficult to extrude and process; (3) the fiber is rough and brittle due to the presence of the nitrogen polymer therein; and (4) the added expense of large amounts of amine polymer is great. Thus it would be highly desirable to make polyester fibers easily dyeable with the large classes of anionic and disperse dyes by the addition of less than 5% of added basic polymer. Our invention represents a practical method for achieving this end.

Another method for rendering polyesters dyeable with acid-type (anionic) dyes is described in U.S. Pat. No. 3,432,250, to Robert Miller et al. This method involves the incorporation of lesser amounts, generally between 0.5% and 10%, of a basic polymer, for instance a polyvinylpyridine, into the polyester before it is formed into fiber. After forming, the fibers are made permeable to anionic, water-soluble dyes by after-treatment with a Lewis acid. The latter step is termed activation. Our invention represents a practical method for achieving permeability to anionic dyes without the necessity for a separate activation step.

It is an object of this invention to provide polyester fibers having good physical properties and which are dyeable with anionic and disperse dyes to deep shades with good fastness properties. It is a further object of this invention to provide polyester fibers which may be dyed with such dyes by conventional techniques, i.e., at temperatures below 100° C., at atmospheric pressure and without the use of a carrier.

It is another object to provide a process for making polyester fibers which are readily dyeable in an economical fashion and without degrading other properties of the resultant product. It is a still further object of this invention to provide a method of dyeing polyester fibers without any additional processing steps being required. Other objects and advantages of this invention will be apparent to those skilled in the art from a study of this specification.

The compositions of matter which have been found to be highly dyeable with anionic and disperse dyes are comprised of (A) about 94% or less by weight of fiber-forming polyester; (B) between about 1.0 and 5% by weight of a pyridine based polymer dye receptor; and (C) between about 3% and 10% by weight of a hydrophilic compound which is a homopolymer or derivative thereof, or copolymer containing a major amount of ethylene oxide units (—$CH_2$—$CH_2$ —O—). The total amount of the (B) plus (C) components in said composition is no less than about 6%. The percentages listed above for each component present in the fiber are given in percent by weight of the total composition.

The matrix materials used to form the shaped articles or fibers of this invention are linear, fiber-forming polyesters. These polyesters include condensation polymers of dihydric alcohols with organo-dibasic acids, particularly dicarboxylic acids, and self-condensation polymers of omega-hydroxy carboxylic acids. It should be understood that the invention is applicable to all film- and fiber-forming polyesters, in which the ester linkages are intralinear, including poly(alkylene alkanedioates), poly (alkylene arenedioates), poly(cycloalkylenedimethylene arenedioates), and analogous materials. Examples of some of the above-named types of polyesters are poly (ethylene adipate), poly(1,4 - cyclohexylenedimethylene adipate), poly(ethylene terephthalate), poly(ethylene isophthalate), poly(coethylene terephthalate-isophthalate) and poly(1,4 - cyclohexylenedimethylene terephthalate). Physically, the polyester may take the form of filaments, yarns, fabrics, tapes, fibrillated tapes, and films or other shaped or molded forms presenting a high ratio of surface to volume.

The pyridine based polymer dye receptor incorporated in the polyester in accordance with the invention is a polymerized mono- or polycyclic pyridinic compound, present either as a homopolymer or as a copolymer with another vinylpyridine monomer copolymerizable therewith. The mono- and polycyclic pyridine based dye receptor polymers used are those based, for example, on monovinylpyridines and monovinylquinolines and alkyl monovinylpyridines and alkyl monovinylquinolines.

The monovinylpyridines useful in making the above-named dye receptive polymers employed in the invention include 2-vinylpyridine, 3-vinylpyridine, 4-vinylpyridine, 4-methyl-2-vinylpyridine, 2-ethyl-5-vinylpyridine, 2-methyl-5-vinylpyridine, 2-ethyl-6-vinylpyridine, 2-isopropenyl-pyridine, etc.

Although the invention is applicable in higher contents of vinylpyridine polymer in the fiber, we prefer to employ the range of 1% to 5%, the particular amount depending upon the pyridinic nitrogen content of said polymer. This lower range is advantageous because of the high cost of the vinylpyridine polymers and because it minimizes any undesirable effects on the physical properties and whiteness of the fiber. The presence of 1% to 5% of vinylpyridine polymer in the fiber is usually sufficient to exhaust a 1% or 3% O.W.F. (on the weight of the fiber) dyebath, which is the range of dyestuff concentration giving deep colors with most dyes. In terms of the actual nitrogen content of the fiber, a minimum of 0.13% pyridinic nitrogen in the fiber is required. The preferred range is between about 0.2% and 0.5% nitrogen (weight percent of pyridinic nitrogen in the fiber). Less basic dye receptor polymers such as polyamides are inoperative in this invention. Low molecular weight basic compounds, such as alkyl or aryl amines, are likewise inoperative in the present invention. Such materials migrate to the surface of the fiber where they are leached into the dyebath, and can no longer function as dye receptors.

A feature of the present invention is the discovery of certain compounds which act as the (C) ingredient.

The third (C) component of the present composition is a hydrophilic compound which is a homopolymer or derivative thereof, or copolymer, containing at least about 70% of ethylene oxide units [—CH$_2$—CH$_2$—O—], and in which the number of ethylene oxide units are at least 20. Thus, poly(ethylene glycols) having molecular weights of from 1,000 to 10,000,000 (the upper limit is not critical) may be used. The preferred molecular weight range of poly(ethylene glycol), however, is between 5,000 and 5,000,000. Other examples of these materials are the copolymers of ethylene oxide with other alkylene oxides, and derivatives of polyethylene glycol such as the alkyl and aryl ethers and esters. The preferred materials for the (C) component are the polyethylene glycols having molecular weights between 5,000 and 5,000,000.

In order for a fiber to possess dyeability of commercial quality, it must be dyeable to deep shades. The mere improvement in dyeability from no dyeability to the ability to attain light shades is wholly insufficient to constitute commercially acceptable dyeability. The present invention produces dyeability to dark shades using conventional dyes and dyeing techniques.

The fiber may be scoured if desired, and dyed by immersion in a dyebath. It is a feature of the present composition of matter that it may be dyed by many types of dyes. Dyes particularly suitable for use with this invention are acid dyes, i.e., those in which the color bodies are anionic, and disperse dyes. Anionic dyes include a number of categories of dyes, one of which is the strong acid dyes, typified by the following:

Acid Blue 80 (C.I. No. 61585)
Acid Yellow 23 (C.I. No. 19140)
Acid Orange 7 (C.I. No. 15510)
Acid Red 73 (C.I. No. 27290)
Acid Blue 45 (C.I. No. 63010)
Acid Blue 78 (C.I. No. 62105)
Acid Blue 62 (C.I. No. 62045)

Another category of anionic dyes is the premetallized dyes typified by the following:

Acid Yellow 121 (C.I. No. 18690)
Acid Orange 60 (the half-chrome complex of 1-phenyl-3-methyl-4-(2-hydroxy-5-sulfamoyl phenylazo)-5-pyrazolone)
Acid Red 209
Acid Blue 168

Still another category of anionic dyes is the direct dyes, typified by the following:

Direct Yellow 44 (C.I. No. 29000)
Direct Red 13 (C.I. No. 22155)
Direct Blue 67 (C.I. No. 27925)

Other categories of anionic dyes which are applicable to our invention are the reactive dyes, typified by Reactive Orange 1, and the mordant acid dyes, typified by Mordant Red 3 (C.I. No. 58005).

The products are also highly dyeable using conventional dyeing techniqes with disperse dyes, typified by Disperse Yellow 23 (C.I. No. 26070), Disperse Blue 1 (C.I. No. 64500) and Disperse Red 13 (C.I. No. 11115); and vat dyes, typified by Vat Green 1 (C.I. No. 59825/6) and Vat Red 1 (C.I. No. 73360/1).

In order to disclose more clearly the nature of the present invention, specific examples of the practice of the invention are hereinafter given. It should be understood, however, that this is done solely by way of example and is intended neither to delineate the scope of the invention nor limit the ambit of the appended claims.

The ethylene oxide homopolymers, copolymers and derivatives used in the examples were commercially available materials sold under various marks, such as "Polyox" or "Carbowax" (Union Carbide Chemical Corp.), "Pluronics" (Wyandotte Chemical Corp.), "Triton" (Rohm and Haas) and "Pegosperse" (Glyco Chemical Corp.).

The term "phr." means "parts per hundred of the resin." The term "o.w.f." means "on the weight of the fiber."

EXAMPLE 1

Three parts of poly(2-vinylpyridine) (prepared by a suspension polymerization method using azo-bis-isobutyronitrile as initiator, and having an intrinsic viscosity of 0.8 measured in pyridine at 30° C.) were milled at 300° F. with six parts of poly(ethylene glycol) of 4 million molecular weight. Nine (9) parts of the milled sample were then ground, dried and blended with 100 parts of dried poly(ethylene terephthalate) pellets. The dry blend was then extruded at 540° F. into a 28-filament yarn using a conventional melt-spinning apparatus. The resultant yarn was drawn 5:1 using a pin at 165° F. and a plate at 340° F., to yield a yarn of 3.5 denier per filament. The tenacity of the yarn was 4.3 grams/denier and its elongation at the break 7%.

Skeins of the drawn yarn were dyed by a conventional procedure as described hereinafter. The yarns were pre-scoured for 20 minutes with a small amount (ca. 1.0% O.W.F.) of a nonionic surfactant such as Triton X–100 (which is a condensate of octylphenol with 9–10 moles of ethylene oxide) at a pH of 9 to 10 at 200° F. using a bath to fiber ratio of 30 to 1. They were then dyed with 3% O.W.F. dye at 210° F. for one hour in a dyebath acidified with 3% O.W.F. of sulfuric acid and containing a small amount of a nonionic surfactant (Triton X–100), using a bath to fiber ratio of 30 to 1. After dyeing, the skeins were post-scoured for 10 minutes at 160° F. in a bath containing a small amount of Triton X–100 at a bath to fiber ratio of 30 to 1.

Using the dyeing procedure described above, deep colors were obtained with 3% OW.F. concentrations of the folowing dyes: Acid Orange 60, Acid Yellow 121, Acid Blue 78, Acid Blue 80, Acid Blue 45, Direct Blue 67, Acid Blue 62 and Disperse Yellow 23.

A similar yarn, spun from a blend containing no poly(ethylene glycol) yielded almost colorless dyeings when dyed in the same manner with the same dyes.

EXAMPLE 2

Various blends containing different amounts of poly(2-vinylpyridine) (PVPy) and polyethylene glycols (PEG) of different molecular weight (M.W.) were blended with 100 parts of poly(ethylene terephthalate), melt-extruded into yarns, drawn and dyed with 3% O.W.F. Acid Orange 60 (Dye (A)), Acid Blue 62 (Dye (B)) and Disperse Yellow 23 (Dye (C)) using the procedure of Example 1. The color intensities obtained with these dyeings are listed in Table I.

Similar yarns, spun from blends containing no poly(ethylene glycol) yielded almost colorless dyeings when dyed in the same manner with the same dyes.

| PVPy (phr.) | PEG M.W. | PEG Phr. | Color intensity Dye (A) | Dye (B) | Dye (C) |
|---|---|---|---|---|---|
| 3 | 4,000,000 | 4 | D | D | M |
| 3 | 600,000 | 4 | D | D | M |
| 3 | 200,900 | 4 | D | D | M |
| 3 | 20,000 | 4 | D | D | M |
| 3 | 6,000 | 4 | D | D | M |
| 1.8 | 4,000,000 | 1.8 | L | L | L |
| 3 | 4,000,000 | 2 | L | L | L |
| 1 | 4,000,000 | 6 | M | M | M |
| 1 | 4,000,900 | 8 | D | MD | MD |
| 1 | 4,000,900 | 10 | D | MD | D |
| 2 | 4,000,000 | 6 | D | VD | VD |
| 2 | 4,000,000 | 8 | D | VD | VD |

Visual color intensity measured according to the following scale: C=colorless; L=light; M=medium; D=dark; V=very.

EXAMPLE 3

Yarns containing 3 phr. of poly(2-vinylpyridine) and 5 phr. of different derivatives of poly(ethylene glycol) (PEG) or a copolymer of ethylene oxide were prepared according to the procedure of Example 1. These all could by dyed to dark shades with 3% O.W.F. Acid Orange 60 using the procedure of Example 1. The materials used in this experiment were:

(a) PEG monostearate, M.W. of PEG=4170
(b) PEG monoether of p-isooctylphenol, M.W. of PEG=3080
(c) PEG monomethylether, M.W. of PEG=5000
(d) Ethylene oxide-propylene oxide block copolymer, with 80% (by weight) ethylene oxide content, M.W. of PEG=16,250

A similar yarn, spun from a blend containing no poly(ethylene glycol) compounds yielded almost colorless dyeings when dyed in the same manner with the same dye.

EXAMPLE 4

A sample of the yarn that was dyed in Example 1 with Acid Orange 60 was submitted to two standard fastness tests of the American Association of Textile Chemists and Colorists (AATCC). The loss of color resulting from 40 hours exposure to carbon arc light in the fadeometer, or from the AATCC wash fastness test (No. IIA) was very slight.

Having thus described our invention what we claim and desire to protect by Letters Patent is:

1. A fiber-forming composition of matter which is dyeable after shaping with anionic and disperse dyes without pretreatment consisting essentially of:
(A) about 94% or less of a fiber-forming polyester
(B) between about 1 and 5% of a pyridine based polymer selected from the group consisting of: poly(vinylpyridines) poly(alkyl-substituted vinylpyridines), copolymers of vinylpyridines and alkyl-vinylpyridines, poly(vinylquinolines) or poly(alkyl-substituted vinylquinolines);
(C) between 3% and 10% of a hydrophilic compound selected from the group consisting of:
 (a) homopolymers of ethylene oxide;
 (b) ether and ester derivatives thereof;
 (c) copolymers of ethylene oxide with propylene oxide;
such materials containing at least about 70% ethylene oxide, and at least about 20 ethylene oxide units,
wherein the total amount of (B) plus (C) component is no less than about 6%.

2. A fiber-forming composition of matter which is dyeable with anionic and disperse dyes without pretreatment consisting essentially of:
(A) about 94% of a fiber-forming polyester
(B) between about 1 and 5% of a pyridine based polymer selected from the group consisting of: poly(vinylpyridines), poly(alkyl-substituted vinylpyridines), copolymers of vinylpyridines and alkyl-vinylpyridines, poly(vinylquinolines) or poly(alkyl-substituted vinylquinolines);
(C) between about 3% and 10% of polyethylene glycol, having a molecular weight of 100 and above, wherein the total amount of (B) plus (C) component is no less than about 6%.

3. A melt extruded fiber, or film which is capable of being formed into a fiber, having the composition defined in claim 1.

4. A melt extruded fiber, or film which is capable of being formed into a fiber, having the composition defined in claim 2.

5. The composition of claim 1 wherein the polyester is selected from the group consisting of poly(ethylene terephthalate), poly(co - ethyleneterephthalate-isophthalate) and poly(1,4-cyclohexylenedimethylene terephthalate).

6. The composition of claim 1 wherein the pyridine based polymer is selected from the group consisting of 2-vinylpyridine and alkyl-2-vinylpyridine homopolymers and copolymers with each other.

7. The composition of claim 1 wherein the derivatives of polyethylene glycol are selected from the group consisting of (a) polyethylene glycol alkyl ethers, (b) polyethylene glycol aryl ethers, (c) polyethylene glycol esters.

8. The composition of claim 1 wherein the hydrophilic compound has a molecular weight of between about 1,000 and 10,000,000.

9. The composition of claim 2 wherein the polyethylene glycol has a molecular weight between about 5,000 and 5,000,000.

10. The melt extruded fiber or film of claim 3 in which the pyridine based polymer contains between about .13% and .5% pyridinic nitrogen therein.

11. A fiber having the composition of claim 6 wherein the polyester is selected from the group consisting of poly(ethylene terephthalate), poly(co-ethylene terephthalate-isophthalate) and poly(1,4-cyclohexylene-dimethylene terephthalate).

12. The fiber of claim 11 in which the hydrophilic compound is selected from the group consisting of polyethylene glycol alkyl ethers, polyethylene glycol aryl ethers, polyethylene glycol esters, and copolymers of ethylene oxide with an alkylene oxide other than ethylene oxide.

References Cited

UNITED STATES PATENTS

| 2,446,581 | 8/1948 | Gold et al. | 260—16 |
| 2,882,255 | 4/1959 | Caldwell et al. | 260—45.4 |
| 3,432,250 | 3/1969 | Miller et al. | 8—29 |
| 3,410,749 | 11/1968 | Chmiel | 161—92 |

FOREIGN PATENTS

| 986,926 | 3/1965 | Great Britain. |
| 625,536 | 5/1963 | Belgium. |
| 1,024,618 | 3/1966 | Great Britain. |

WILLIAM H. SHORT, Primary Examiner

MELVIN GOLDSTEIN, Assistant Examiner

U.S. Cl. X.R.

8—55